(12) United States Patent
Bernhardt

(10) Patent No.: US 11,879,597 B2
(45) Date of Patent: Jan. 23, 2024

(54) DEVICE AND METHOD FOR STORING AND TRANSFERRING CRYOGENIC FLUID

(71) Applicant: L'Air Liquide, Societe Anonyme pour l'Etude et l'Exploitation des Procedes Georges Claude, Paris (FR)

(72) Inventor: Jean-Marc Bernhardt, Sassenage (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/793,261

(22) PCT Filed: Dec. 14, 2020

(86) PCT No.: PCT/EP2020/085982
§ 371 (c)(1),
(2) Date: Jul. 15, 2022

(87) PCT Pub. No.: WO2021/144095
PCT Pub. Date: Jul. 22, 2021

(65) Prior Publication Data
US 2023/0135431 A1    May 4, 2023

(30) Foreign Application Priority Data
Jan. 17, 2020   (FR) .................................... 2000476

(51) Int. Cl.
*F17C 13/08*   (2006.01)
*F17C 13/04*   (2006.01)

(52) U.S. Cl.
CPC ............ *F17C 13/083* (2013.01); *F17C 13/04* (2013.01); *F17C 2201/0109* (2013.01);
(Continued)

(58) Field of Classification Search
CPC ...................... F17C 2205/0367; F17C 13/083
(Continued)

(56) References Cited

U.S. PATENT DOCUMENTS 2,048,312 A * 7/1936 Zulver .................... B63B 25/14
137/571
2009/0255274 A1* 10/2009 Ungar ....................... F17C 9/02
62/50.1

FOREIGN PATENT DOCUMENTS

KR   2013 0 050 820      5/2013
WO   WO-2016051768 A1 *  4/2016 ............. B63B 27/24
WO   WO 2016 075 186     5/2016

OTHER PUBLICATIONS

WO-2016051768-A1—English Translation (Year: 2016).*
(Continued)

*Primary Examiner* — Timothy P. Kelly
*Assistant Examiner* — Christopher M Afful
(74) *Attorney, Agent, or Firm* — Allen E. White; Christopher J. Cronin

(57) ABSTRACT

Device for storing and transferring cryogenic fluid, comprising at least one elementary container comprising a liquefied gas tank, the tank being provided with a first pipe for transferring fluid, which pipe has a first end connected to an upper end of the tank, the tank being provided with a second pipe for transferring fluid, which pipe has a first end connected to a lower end of the tank, the first and the second transfer pipes each comprising an assembly of respective valves, characterized in that the first transfer pipe comprises two arms forming two second ends connected in parallel to the first end of the first transfer pipe, the two second ends of the first transfer pipe each being provided with a respective fluidic connection coupling, and in that the second transfer pipe comprises two arms forming two second ends connected in parallel to the first end of the second transfer pipe, (Continued)

the two second ends of the second transfer pipe each being provided with a respective fluidic connection coupling.

10 Claims, 3 Drawing Sheets

(52) U.S. Cl.
CPC .................. *F17C 2201/035* (2013.01); *F17C 2205/0134* (2013.01); *F17C 2205/0157* (2013.01); *F17C 2205/037* (2013.01); *F17C 2205/0367* (2013.01); *F17C 2221/012* (2013.01); *F17C 2223/0161* (2013.01); *F17C 2270/0171* (2013.01)

(58) Field of Classification Search
USPC ......................................................... 141/231
See application file for complete search history.

(56) References Cited

OTHER PUBLICATIONS

International Search Report and Written Report for PCT/EP2020/085982, dated Mar. 12, 2021.
French Search Report and Written Opinion for FR 2 000 476, dated Sep. 24, 2020.

* cited by examiner

[Fig. 1]
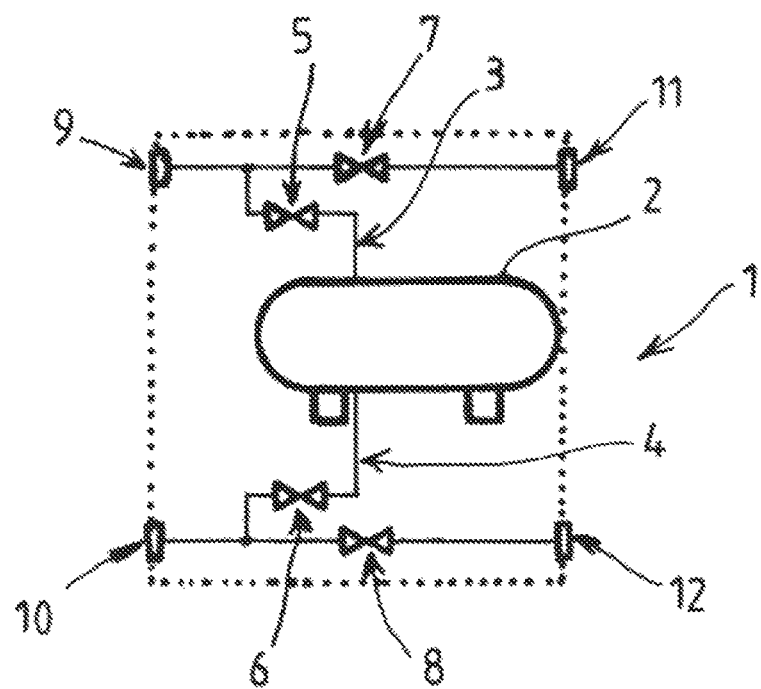
[Fig. 2]
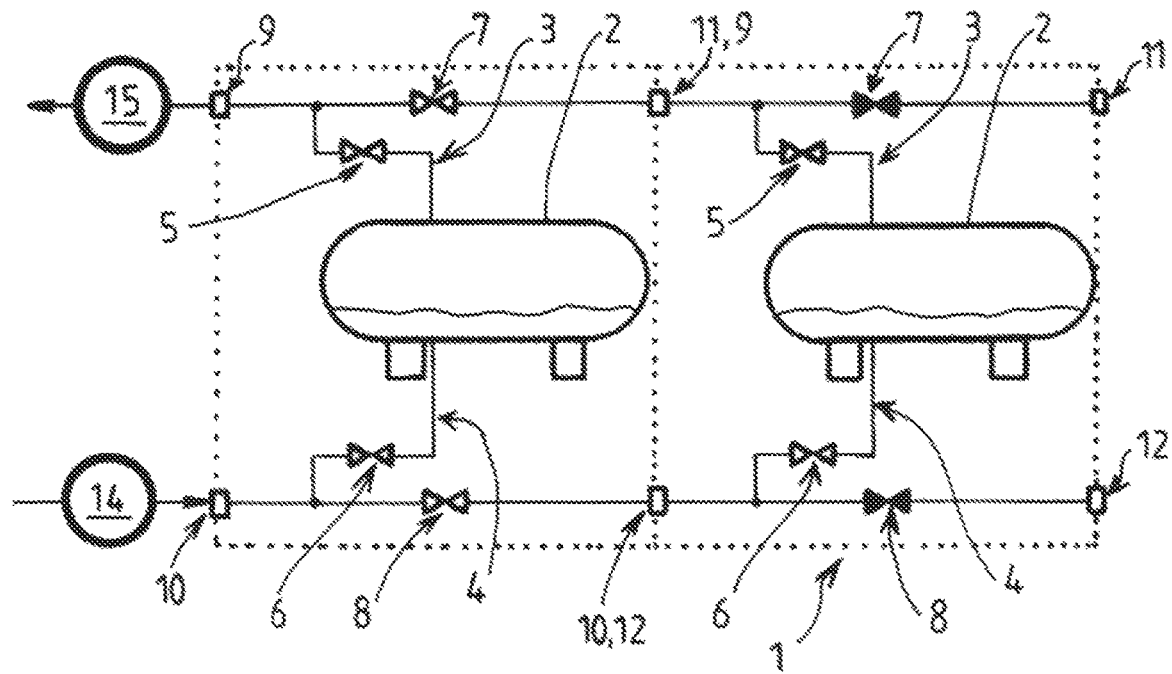

[Fig. 3]
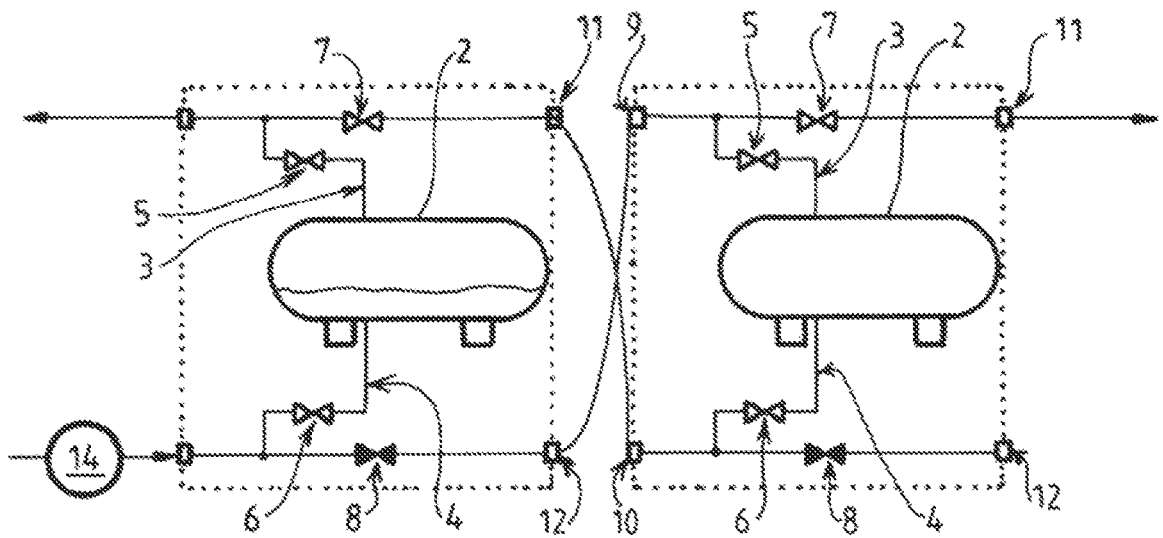
[Fig. 4]
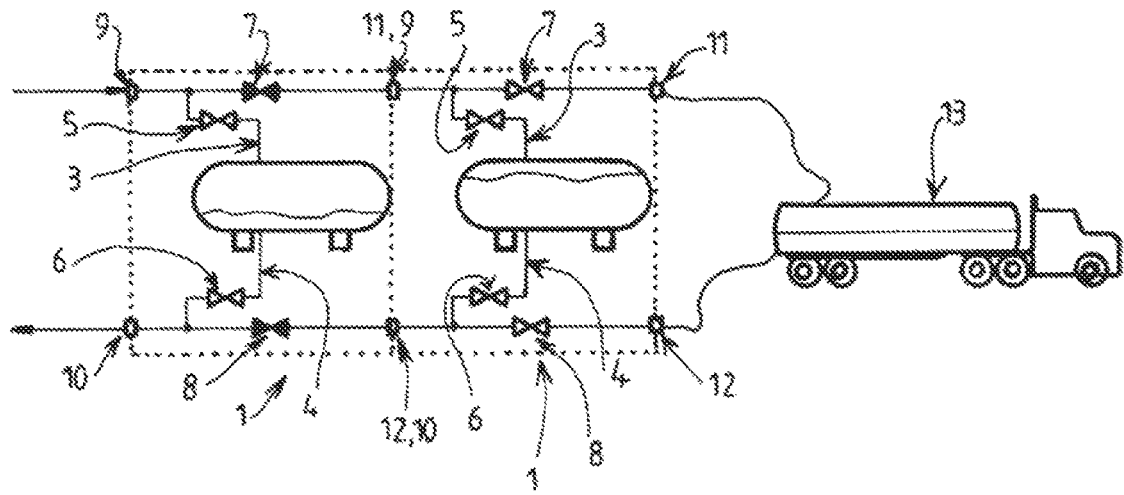

[Fig. 5]
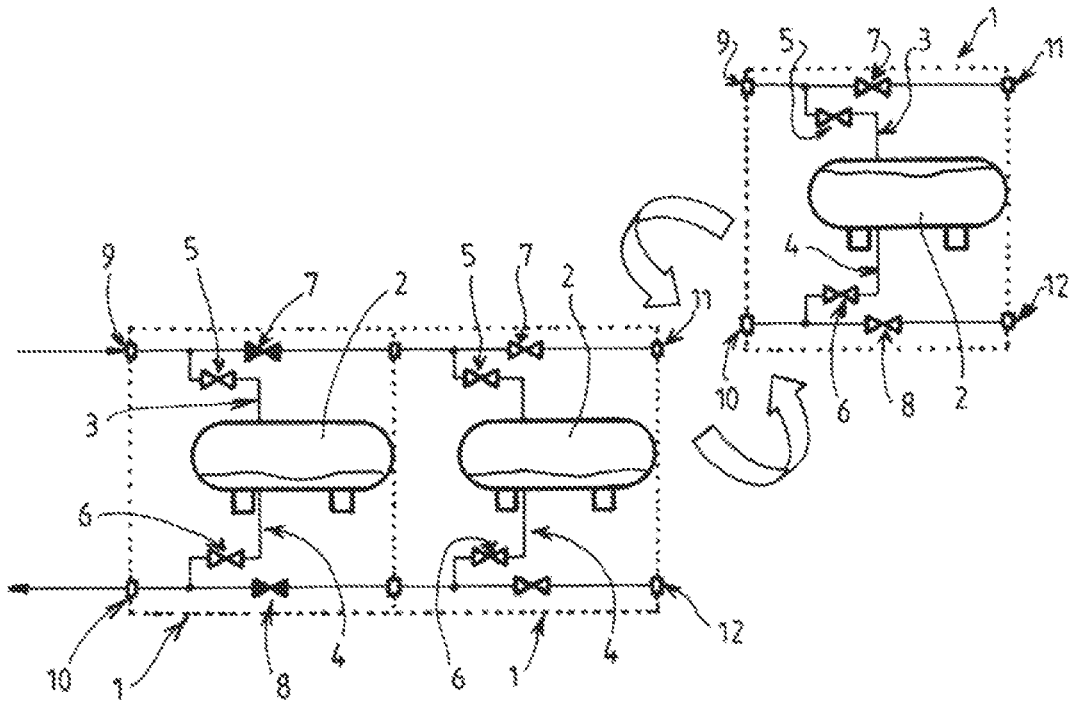
[Fig. 6]
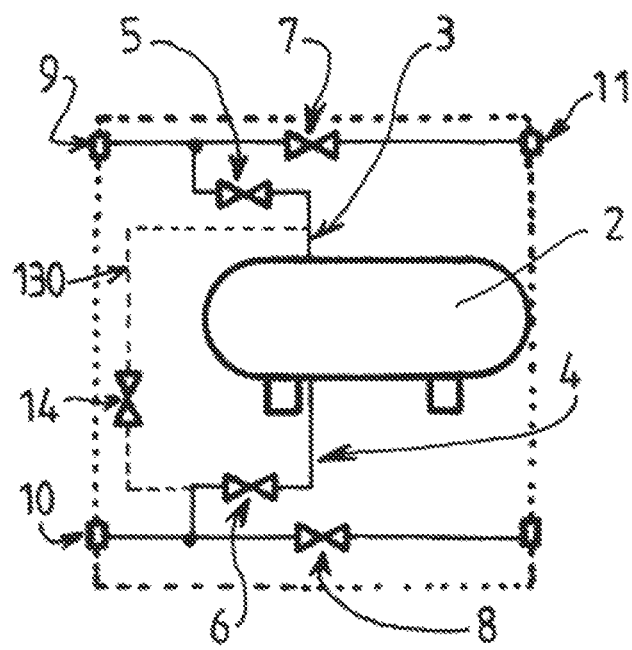

DEVICE AND METHOD FOR STORING AND TRANSFERRING CRYOGENIC FLUID

CROSS-REFERENCE TO RELATED APPLICATIONS

This application is a § 371 of International PCT Application PCT/EP2020/085982, filed Dec. 14, 2020, which claims § 119(a) foreign priority to French patent application FR 2000476, filed Jan. 17, 2020.

BACKGROUND

Field of the Invention

The invention relates to a device and a method for storing and transferring cryogenic fluid.

The invention relates more particularly to a device for storing and transferring cryogenic fluid, comprising at least one basic container comprising a tank of liquefied gas, the tank being provided with a first fluid transfer pipe having a first end connected to an upper end of the tank, the tank being provided with a second fluid transfer pipe having a first end connected to a lower end of the tank, the first transfer pipe and the second transfer pipe each comprising a set of respective valves.

The invention relates in particular to tanks for storing liquefied hydrogen or helium.

Related Art

On account of its greater density, liquid hydrogen is preferred to gaseous hydrogen when large quantities of product need to be transported over long distances. Another advantage of liquid hydrogen is its purity since, at a temperature of 20 K, this eliminates, de facto, all the impurities (which are solid at this temperature) from the gas, thereby optimizing the operation of the fuel cells that use it.

The low density of liquid hydrogen compared with water, for example, limits the pressure available through hydrostatic head. Thus, at low temperature, this can result in fairly high losses by evaporation during transfers. Systems for loading trucks and tanks at hydrogen supply stations can thus result in losses that can range to up to 15% of production.

These truck pressurization losses can of course be wasted at each station or recovered, reheated, recompressed and reinjected into a liquefier, if an investment is made in a loss recirculation system and if the liquefaction system is dimensioned accordingly.

The operating principles of fixed or mobile storage facilities are identical but the production thereof is different on account of the different regulatory and performance-related constraints.

At service stations, the storage facilities are fixed and have a size set by the model chosen. The change in its size as a function of the attendance of the station is not possible without a large site.

Mobile storage facilities are designed to maximize the payload but are sometimes too large to supply service stations in urban centers. They are not easily convertible into a temporary fixed storage facility for full-for-empty exchanges.

Moreover, the times for connecting the mobile liquefied gas storage facilities to and purging them with the installations (liquefier and/or service stations) are generally long, complex and required qualified personnel.

For logistics, it is more advantageous to transport a large quantity of liquefied gas in the same vehicle, but for the management of vaporization ("boil-off") gases, it is preferably to split the quantities in order to limit successive pressurization operations.

SUMMARY OF THE INVENTION

An aim of the present invention is to overcome all or some of the drawbacks of the prior art that are set out above.

To this end, the device according to the invention, which is otherwise in accordance with the generic definition thereof given in the preamble above, is essentially characterized in that the first transfer pipe comprises two branches forming two second ends connected in parallel to the first end of the first transfer pipe, the two second ends of the first transfer pipe each being provided with a respective fluidic connection fitting, and in that the second transfer pipe comprises two branches forming two second ends connected in parallel to the first end of the second transfer pipe, the two second ends of the second transfer pipe each being provided with a respective fluidic connection fitting.

Furthermore, embodiments of the invention may have one or more of the following features:
- the first transfer pipe comprises a first valve situated in the vicinity of its first end and a second valve situated at one of the two second ends,
- the second transfer pipe comprises a first valve situated in the vicinity of its first end and a second valve (8) situated at one of the two second ends,
- the fluidic connection fittings situated at the second ends of the transfer pipes are fittings of the quick-connection type,
- the basic container comprises a third connecting pipe having a first end connected to the upper end of the tank and a second end connected to the lower part of the tank, said third connecting pipe comprising a set of valves,
- the first end of the third connecting pipe is connected to the first end of the first transfer pipe,
- the second end of the third connecting pipe is connected to the first end of the first transfer pipe,
- the device comprises at least two basic containers fluidically connected to one another,
- the device comprises a first basic container, a second end of the first transfer pipe of which is connected to a second end of the first transfer pipe of a second basic container, a second end of the second transfer pipe of the first basic container being connected to a second end of the second transfer pipe of the second basic container,
- the device comprises a first basic container, a second end of the first transfer pipe of which is connected to a second end of the second transfer pipe of a second basic container, a second end of the second transfer pipe of the first basic container being connected to a second end of the first transfer pipe of the second basic container,
- the device comprises a mobile tank for transporting liquefied gas and a basic container, a second end of the first transfer pipe of which is connected to an upper end of the mobile tank and wherein a second end of the second transfer pipe of said basic container is connected to a lower end of the mobile tank.

The invention also relates to a method for storing and transferring cryogenic fluid by means of a device for storing and transferring fluid according to any one of the features above and below, wherein the device for storing and transferring fluid comprises at least one basic container, the tank of which contains a liquefied gas in equilibrium with a gas phase, the method comprising at least one of: a step of withdrawing gas from the tank via a second end of the first transfer pipe, and a step of transferring liquefied gas from a liquefied gas source in the tank via a second end of the second transfer pipe.

According to other possible particular features:

the method comprises a step of transferring liquefied gas from a liquefied gas source in the tank via a second end of the second transfer pipe, said source comprising at least one of: a liquefier, and a mobile tank for transporting liquefied gas.

The invention may also relate to any alternative device or method comprising any combination of the features above or below within the scope of the claims.

BRIEF DESCRIPTION OF THE FIGURES

Further particular features and advantages will become apparent from reading the following description, which is given with reference to the figures, in which:

FIG. 1 shows a schematic and partial view illustrating one example of the structure and operation of a storage and transfer device comprising a single basic container, FIG. 2 shows a schematic and partial view illustrating one example of the structure and operation of a storage and transfer device comprising two connected basic containers, FIG. 3 shows a schematic and partial view illustrating one example of the structure and operation of a storage and transfer device comprising two non-connected basic containers, FIG. 4 shows a schematic and partial view illustrating the storage and transfer device from FIG. 2 connected to a mobile delivery tank, FIG. 5 shows a schematic and partial view illustrating the storage and transfer device from FIG. 2 with an operation for exchanging one of the two containers that make it up, FIG. 6 shows a schematic and partial view illustrating another example of the structure and operation of a storage and transfer device comprising a single basic container.

DETAILED DESCRIPTION OF THE INVENTION

The device for storing and transferring cryogenic fluid is made up of one or more basic containers 1 illustrated by way of example in FIG. 1.

The basic container 1 comprises preferably a single liquefied gas tank 2, for example a vacuum-insulated double-walled cryogenic tank. This tank 2 is provided with a first fluid transfer pipe 3 having a first end connected to an upper end of the tank 2 (that is to say in the part of the tank which accommodates the gas phase of the stored cryogenic fluid).

This first transfer pipe 3 comprises, at the opposite end from the first end, two separate branches forming two second ends. These two second ends are connected in parallel to the first end of the first transfer pipe 3.

This means that fluid can pass through one or both second ends toward the gas phase of the tank 2 or from the gas phase of the tank toward one or both second ends.

The two second ends of the first transfer pipe 3 are each preferably provided with a respective fluidic connection fitting 9, 11.

The tank 2 also comprises a second fluid transfer pipe 4 having a first end connected to a lower end of the tank 2 (that is to say in the part of the tank which accommodates the liquid phase of the stored cryogenic fluid).

The second transfer pipe 4 likewise comprises two branches forming two second ends connected in parallel to the first end of the second transfer pipe 4. This means that fluid can pass through one or both second ends toward the liquid phase of the tank 2 or from the liquid phase of the tank toward one or both second ends.

The two second ends of the second transfer pipe 4 are each preferably provided with a respective fluidic connection fitting 10, 12. These fluidic connection fittings 9, 10, 11, 12 situated at the second ends of the transfer pipes may be fittings of the quick-connection type.

The first transfer pipe 3 and the second transfer pipe 4 each comprise a set of respective valves 4, 5, 6, 7 that make it possible, depending on their open or closed state, to allow or not to allow fluid to pass through between two second ends 9, 11 or 10, 12 or between one or more second ends 9, 11, 10, 12 and the tank 2. The valve or valves are, for example, manually operated or system-operated isolation valves. These valves may be open or closed in order to allow or not to allow the transfer of fluid (filling or withdrawing). These valves may be of the "all-or-nothing" opening type or of the gradually opening type.

For example, the first transfer pipe 3 may comprise a first valve 5 situated in the vicinity of its first end and a second valve 7 situated at one of the two second ends.

In the closed position, the first valve 5 situated in the vicinity of its first end isolates the upper part of the tank 2 from the two second ends of the first transfer pipe 3. In the closed position, the second valve 7 situated in the vicinity of a second end 11 prevents fluid from passing through between the two second ends 9, 11 and between the second end in question and the tank 2. This second valve 7 makes it possible, where appropriate, to isolate the gaseous part of the basic container 1 from another container or exterior application.

Similarly, the second transfer pipe 4 may comprise a first valve 6 situated in the vicinity of its first end and a second valve 8 situated at one of the two second ends.

In the closed position, the first valve 6 situated in the vicinity of its first end isolates the lower part of the tank 2 from the two second ends of the second transfer pipe 4. In the closed position, the second valve 8 situated in the vicinity of a second end 12 prevents fluid from passing through between the two second ends 10, 12 and between the second end in question 12 and the tank 2. This second valve 8 makes it possible, where appropriate, to isolate the liquid part of the basic container 1 from another container 1 or exterior application.

This forms a basic container 1 allowing modularity of the storage of liquefied gas.

This architecture makes it possible to connect several basic containers 1 allowing several combinations of different architectures as required (station size, loading in parallel, full-for-empty exchange, etc.).

This also allows a simple solution for moving/replacing fixed storage facilities with the same architecture but different sizes.

The architecture allows quick connection/disconnection of the container or containers 1 to/from production sites or a source (liquefier for example) or sites for use of the liquefied gas (service station for example).

Preferably, the modular container 1 is mobile and suitable for transport.

As illustrated, this architecture makes it possible to connect several basic containers 1 in series or in parallel.

In the example in FIG. 2, the device comprises a first basic container 1 (on the left), a second end 11 of the first transfer pipe 3 of which is connected to a second end 9 of the first transfer pipe 3 of a second basic container 1 (on the right). Moreover, a second end 12 of the second transfer pipe 4 of the first basic container 1 is connected to a second end 10 of the second transfer pipe 4 of the second basic container 1.

The two basic containers 1 can thus be connected in parallel to a source 14 and/or a receiver 15 that is/are connected to the free ends (on the left) of the first basic container 1.

Thus, which the valves 4, 5, 6, 7 of the first basic container 1 open, the first valves 5, 6 of the second basic container 1 open (in white) and the second valves 7, 8 of the second basic container 1 closed (in black), the upper ends of the two tanks 2 can be connected in parallel to a pressurized-gas receiver 15 in order, for example, to recover pressurized gas in order to lower the pressure in the tank or tanks 2. Moreover, in this configuration, the lower ends of the two tanks 2 can be connected in parallel to a source 15 of liquid in order for example to fill them.

In the example in FIG. 3, the device comprises a first basic container 1 (on the left), a second end 11 of the first transfer pipe 3 of which is connected to a second end 10 of the second transfer pipe 4 of a second basic container 1 (on the right). Moreover, a second end 12 of the second transfer pipe 4 of the first basic container 1 is connected to a second end 9 of the first transfer pipe 3 of the second basic container 1.

The second valves 8 of the second pipes 4 of the two container 1 are closed (in black) while the other valves 5, 6, 7 are open (in white).

The two basic containers 1 can thus be connected in series to a source and/or a receiver that is/are connected to the free ends (on the left) of the first basic container 1.

The gaseous part of the tank 2 of the first basic container 1 (on the left) can thus be connected to the liquid part of the tank 2 of the second basic container 1. Pressurized gas from the tank 2 of the first basic container 1 can thus be transferred into the liquid part of the tank 2 of the second basic container 1.

Moreover, liquid provided by a source 14 can be transferred into the liquid part of the tank 2 of the first basic container 1, the gas pushed by the liquid of the first container 1 can thus be transferred into the liquid part of the tank 2 of the second elementary container 1 (via the second pipe 4 and then the first pipe 3 of the first basic container 1 and then via the second pipe 4 of the second basic container 1). This ensures that the tank 2 of the second basic container 1 is cooled with gas rather than with liquid.

In the example in FIG. 4, the device comprises a mobile tank 13 for transporting liquefied gas (for example a semi-trailer transporting liquefied gas with a gas phase). Two basic containers 1 are connected according to the arrangement in FIG. 2.

The second basic container 1 (on the right) has the free second end 11 of its first transfer pipe 3 connected to an upper end of the mobile tank 13 and the free second end 12 of its second transfer pipe 4 connected to a lower end of the mobile tank 13.

The valves 4, 5, 6, 7 of the second basic container 1 (on the right) are open (in white). The second valves 7, 8 of the first basic container (on the left) are closed (in black) while the other valves 5, 6 of the first basic container 1 are open (in white). This makes it possible to fill the second container 1 with liquid from the mobile tank 13 while ensuring pressure equalization with the mobile tank 13. Moreover, at the same time or not at the same time, liquid can be drawn from the tank 2 of the first mobile container 1 toward a user via the second pipe 4 and pressurized gas can be admitted into this same tank (via the first pipe 3).

FIG. 6 shows a possible embodiment variant of the basic container. This differs from the one in FIG. 1 only in that it also comprises a third connecting pipe 130 having a first end connected to the upper part of the tank 2, for example via the first transfer pipe 3, and a second end connected to the lower part of the tank 2, for example via the second transfer pipe 4, this third connecting pipe 130 comprising a set of valves 14, for example one valve. As illustrated, the first end of the third connecting pipe 130 can be connected to the first end of the first transfer pipe 3, for example between the first valve 5 and the upper end of the tank 2. Similarly, the second end of the third connecting pipe 130 can be connected to the first end of the second transfer pipe 4, for example between the first valve 6 and the two second ends of this second transfer pipe 4.

This makes it possible to provide, if necessary, a direct fluidic connection between the upper and lower ends of the tank 2 (via the appropriate opening of the corresponding valve 14, 6). This third connecting pipe 130 makes it possible in particular to fill or withdraw from the tank at the top via the second transfer pipe 4 and/or to fill or withdraw at the bottom of the tank via the first transfer pipe 3. This makes it possible to fill the tank 2 at the top without changing connections. The basic containers in FIG. 1 and FIG. 6 can be linked in series or in parallel if necessary.

In the example in FIG. 5, the device comprises two basic containers 1 that are connected according to the arrangement in FIG. 2. When the tank 2 of one of the two containers 1 is empty, it can be replaced by replacing the container 1 in question with a container 1 having a full tank 2. In this example, the second basic container 1 (on the right) can be replaced by operating the valves appropriately. For example, the second valves 7, 8 of the first basic container (on the left) can be closed (in black) in order to isolate the second container 1 (on the right). This second basic connector 1 can be disconnected from the first container 1 and replaced with a new basic container 1.

This makes it possible to carry out a full-for-empty exchange in the chain of connected basic containers 1.

The invention has been described in architectures having two basic container 1, but, of course, other architectures can be envisioned, in particular having three or more than three basic containers 1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for storing and transferring cryogenic fluid, comprising at least one basic container comprising a double-walled cryogenic tank of liquefied gas, the tank being provided with a first transfer pipe having a first end connected to an upper end of the cryogenic fluid tank, the cryogenic fluid tank being provided with a second transfer pipe having a first end connected to a lower end of the cryogenic fluid tank, the first transfer pipe and the second transfer pipe each comprising a set of respective valves, wherein:
    the first transfer pipe comprises two branches forming two second ends connected in parallel to the first end of the first transfer pipe,
    the two second ends of the first transfer pipe each being provided with a respective fluidic connection fitting;
    the second transfer pipe comprises two branches forming two second ends connected in parallel to the first end of the second transfer pipe,
    the two second ends of the second transfer pipe each being provided with a respective fluidic connection fitting,
    the first transfer pipe is configured to allow cryogenic gas to be removed from the double-walled cryogenic tank of liquefied gas, and
    the second transfer pipe is configured to allow cryogenic liquid to be removed from or introduced into the double-walled cryogenic tank of liquefied gas,
    wherein the basic container comprises a third connecting pipe having a first end connected to the upper end of the tank and a second end connected to the lower part of the tank, said third connecting pipe comprising a set of valves,
    wherein the first end of the third connecting pipe is connected to the first end of the first transfer pipe,
    wherein the second end of the third connecting pipe is connected to the first end of the second transfer pipe,
    wherein said at least one basic container comprises two basic containers that are fluidically connected to one another, and
    wherein said at least one basic container comprises first and second basic containers, a second end of the first transfer pipe of which is connected to a second end of the first transfer pipe of the second basic container, and in that a second end of the second transfer pipe of the first basic container is connected to a second end of the second transfer pipe of the second basic container.

2. The device of claim 1, wherein the first transfer pipe comprises a first valve situated in a vicinity of the first end thereof and a second valve situated at one of the two second ends thereof.

3. The device of claim 1, wherein the second transfer pipe comprises a first valve situated in a vicinity of the first end thereof and a second valve situated at one of the two second ends thereof.

4. The device of claim 1, wherein the fluidic connection fittings situated at the second ends of the transfer pipes are fittings of the quick-connection type.

5. The device claim 1, wherein said at least one basic container comprises first and second basic containers, a second end of the first transfer pipe of which is connected to a second end of the second transfer pipe of the second basic container, and in that a second end of the second transfer pipe of the first basic container is connected to a second end of the first transfer pipe of the second basic container.

6. The device of claim 1, further comprising a mobile tank for transporting liquefied gas and a basic container, a second end of the first transfer pipe of which is connected to an upper end of the mobile tank, wherein a second end of the second transfer pipe of said basic container is connected to a lower end of the mobile tank.

7. A method for storing and transferring cryogenic fluid with the device for storing and transferring fluid of claim 1, wherein the tank of the at least one basic container contains a liquefied gas in equilibrium with a gas phase, the method comprising at least one of: a step of withdrawing gas from the tank via a second end of the first transfer pipe, and a step of transferring liquefied gas from a liquefied gas source in the tank via a second end of the second transfer pipe.

8. The method of claim 7, further comprises a step of transferring liquefied gas from a liquefied gas source in the tank via a second end of the second transfer pipe, said source comprising at least one of: a liquefier, and a mobile tank for transporting liquefied gas.

9. A device for storing and transferring cryogenic fluid, comprising at least one basic container comprising a double-walled cryogenic tank of liquefied gas, the tank being provided with a first transfer pipe having a first end connected to an upper end of the cryogenic fluid tank, the cryogenic fluid tank being provided with a second transfer pipe having a first end connected to a lower end of the cryogenic fluid tank, the first transfer pipe and the second transfer pipe each comprising a set of respective valves, wherein:
    the first transfer pipe comprises two branches forming two second ends connected in parallel to the first end of the first transfer pipe, the two second ends of the first transfer pipe each being provided with a respective fluidic connection fitting; the second transfer pipe comprises two branches forming two second ends connected in parallel to the first end of the second transfer pipe, the two second ends of the second transfer pipe each being provided with a respective fluidic connection fitting,
    the first transfer pipe is configured to allow cryogenic gas to be removed from the double-walled cryogenic tank of liquefied gas, and
    the second transfer pipe is configured to allow cryogenic liquid to be removed from or introduced into the double-walled cryogenic tank of liquefied gas, wherein the basic container comprises a third connecting pipe having a first end connected to the upper end of the tank and a second end connected to the lower part of the tank, said third connecting pipe comprising a set of valves, wherein the first end of the third connecting pipe is connected to the first end of the first transfer pipe, wherein the second end of the third connecting pipe is connected to the first end of the second transfer pipe, wherein said at least one basic container comprises first and second basic containers, a second end of the first transfer pipe of which is connected to a second end of the first transfer pipe of the second basic container, and in that a second end of the second transfer pipe of the first basic container is connected to a second end of the second transfer pipe of the second basic container, thereby being configured to allow pressurized gas from the first basic container to be transferred to the liquid part of the second basic container.

10. A method for storing and transferring cryogenic fluid with the device for storing and transferring fluid of claim 9, wherein the tank of the at least one basic container contains a liquefied gas in equilibrium with a gas phase, the method comprising transferring pressurized gas from the first basic container to the liquid part of the second basic container.

* * * * *